Figure 1:
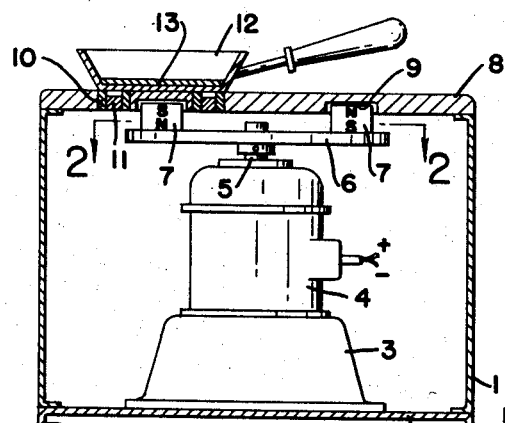

Nov. 10, 1959 M. BAERMANN 2,912,552
APPARATUS FOR HEATING
Filed Jan. 31, 1957 2 Sheets-Sheet 1

INVENTOR.
MAX BAERMANN
BY Alfred C. Body
ATTORNEY

Nov. 10, 1959 M. BAERMANN 2,912,552
APPARATUS FOR HEATING
Filed Jan. 31, 1957 2 Sheets-Sheet 2

INVENTOR.
MAX BAERMANN
BY
ATTORNEY

United States Patent Office 2,912,552
Patented Nov. 10, 1959

2,912,552
APPARATUS FOR HEATING
Max Baermann, Koln (Rhine), Germany
Application January 31, 1957, Serial No. 637,491
Claims priority, application Germany February 4, 1956
23 Claims. (Cl. 219—10.49)

The present invention relates to the art of heating bodies of material such as food, liquids and the like, and, more in particular, to a device for changing mechanical energy into heat by the use of eddy current or hysteresis effects on the body of the pan containing the body which is to be heated.

Prior to the present invention, it has been proposed that containers for heating food, bodies of material or the like, be brought into rapidly changing magnetic fields which will establish eddy currents in the conductive metallic containers or in the material to be heated. These prior processes required a considerable expenditure for the apparatus to carry out the process, since it was necessary to select alternating fields of high frequency in order to attain a thorough heating of the food or other material in the shortest possible time. Attempts also have been made to utilize the dielectric losses in the electrical field for the direct heating of the food, or the like, by placing the food, or similar material, in a container or pan made of electrically non-conducting materials. In such cases, the container or pan remained unheated. It has been found that if these prior devices or processes were used, special heat radiators or similar apparatus had to be provided if an overheating of the food on the surface thereof is desired for flavoring or other reasons.

The present invention contemplates eliminating the disadvantages in the prior devices and processes by exposing the material or food to be heated and/or the pan containing such material to multi-pole field magnet means and mechanically establishing a relative motion between the body to be warmed and the field magnet, thereby developing an alternating field of high frequency in the container or pan and/or the material or food to be heated. The resultant eddy currents and/or hysteresis losses of high intensity heat the pan and/or material or food rapidly.

The invention further contemplates controlling the temperature or the intensity or speed of heating of the body of material or food by controlling the distance between the magnets and the food or pan or by controlling the speed of relative movement between the food and the magnets, or both.

The invention further contemplates structure associated with the mechanical means for providing the relative motion between the body to be warmed and the field magnet which is automatically adjustable to prevent overloading of the mechanical means.

In accordance with the present invention, there is provided a multi-pole field magnet and a mechanical means adapted to establish relative motion between the field magnet and the body of material or the pan to be warmed. The multi-pole field magnet in this device may be in the form of single pole pieces of permanently magnetic material and a ferro-magnetic ground body of supporting plate, or entirely of permanently magnetic material. It is understood that electro-magnets can also be used instead of permanent magnets in which case the field magnet may consist of a ferro magnetic material provided with salient poles which carry coils capable of being energized by direct current. When the magnets are of the electro-magnet type, their field intensity may be easily controlled by means of resistors or other well known electrical control devices. If electro-magnets are used, suitable slip rings will be needed to connect the coil to a source of current whereas if permanently magnetic material is used for the field magnet, the slip rings can be eliminated.

However, in order to reduce as much as possible the unavoidable flux leakage between pole tips with electro magnets the top of the poles, or that end of the magnet which will be closest to the pan or the food, may be provided with a permanently magnetic material, preferably one with a magnetic privileged direction, to reduce as much as possible the dispersion of the flux at the top of the poles. Preferably, the privileged direction of the permanently magnetic material is in the desired field direction since the permeability across the direction is less than it is in the privileged direction.

In using permanent magnets to create the magnetic field, an arrangement in which the field magnet consists of a circular disc-shaped ground body of ferro-magnetic material has shown itself especially advantageous. This body carries radially arranged and attached axially magnetized poles with alternating polarization. These axially magnetized poles revolve with the ground body which is pivotally mounted on suitable supporting structure. It is understood that the field magnet may also be made of a barrel shaped or cylinder ring-shaped body of ferromagnetic material supporting pole pieces, which are arranged in the form of axial ribs and are magnetized in a radial direction, and with alternate polarization. Such structure forms an inner or an outer magnet wheel wherein the magnetic poles revolve with the ground body.

It is also understood that the field magnet may consist of a flat plate of ferro-magnetic material with the magnet pole pieces being fastened parallel to each other and magnetized with alternate polarization. The plate and the poles may be vibrated in directions parallel to the plane of the plate, or perpendicular to the privileged direction of the magnet poles and relative to the pan, food, and/or material to be heated. Naturally, the shape of the body to be heated determines the exact design of the field magnet and whether it will be of a disc shape, cylinder shape, rectangular shape, or other suitable shape.

A path for the magnetic field may be provided in the bodies to be heated, or the pan, by having a ferro-magnetic body in the pan or the body to be heated. Between the ferro-magnetic body, which provides a path for the magnetic field, and the field poles, there may be placed an electrically conductive material which is exposed to the influence of the magnetic field. It is well known in the field of electro-magnetism that movement of the electrically conductive material relative to the flux of the magnet, or vice versa, establishes eddy currents which heat the electrically conductive material and that the ferromagnetic path for the flux will become heated by hysteresis losses occurring therein.

If the ferro-magnetic body forming a path for the magnetic flux has a large hysteresis loss, it is possible to heat the body entirely by such hysteresis loss and to have a pan of ferro-magnetic material. Additional heating by means of eddy currents may be provided by having a layer of electrically conductive material on the side of the ferro-magnetic body which is next to the magnetic field poles.

There will be a tendency for the electro conductive or ferro magnetic bodies to move when the magnetic field is moved because of the motoring action established therebetween. For example, if the magnetic field is rotated, motoring forces will be established which will tend to rotate the pan containing the food or other material to be heated. Movement of the pan, or material being heated, may be prevented by using stationary permanent or electro magnets, or other suitable holding means, which will prevent movement of the pan or body of material being heated when the magnetic field is moved.

Generally, the supporting structure is in the form of a cover plate, top, or the like, which extends over the moving field magnet and on which the bodies, pans, or the like, to be heated, are positioned. The magnets, or holding devices, or the like, for preventing movement of the pans or the materials to be heated, may be placed at suitable positions in this cover plate or top. When electro magnets are used to hold the pan, or material to be heated, stationary relative to the top, suitable switches may be used to control the energization of these electro magnets so that they will hold the pan while the field magnet which establishes the flux field for heating the pan and the food is moved. If desired, this switch and the mechanical means for moving the field magnets may be tied together in such manner that the mechanical means will not move the field magnets unless the holding magnets are energized.

It has also been found that the forces needed to stabilize the pan resting on the top to prevent it from moving when the magnetic field is moved may be reduced by having some of the magnet poles move in one direction and other of the magnet poles move in an opposite direction. For example, the field magnet may be divided into two or more magnet groups, each group working alike and arranged to move in opposite directions. The field magnet thus may be made of two concentric rings, each provided with magnet poles of parallel axis and with the rings adapted to be rotated in opposite directions so that they will tend to move the pan or the body being heated in opposite directions simultaneously, thus permitting the use of a relatively light magnet to hold the pan in a stationary position.

In these various constructions of the invention, the intensity of heating or the capacity of the unit is at least partly dependent on the number of magnetic poles or the velocity of motion, or the frequency of changing the polarity of the field which creates the eddy currents in the pan, or the material being heated, so that heating occurs either in the shortest time, or to a desired extent.

The temperature of the body to be heated can be regulated by automatically changing the distance between the field magnets and the body by means of expansion members, or the like. Suitable guide means such as, for example, studs, pin guides, or the like, may be used to permit movement of the field magnets relative to the top, or to the body to be heated, and in a direction perpendicular to the plane of the top while permitting driven movement in a direction parallel with the plane of the top.

The mechanical means which moves the field magnet may be driven by any of the well known types of motors such as, water, air, electric or combustion motors. Preferably, the field magnet is positioned and mounted in connection with mechanical means for moving it so that the field magnet will establish magnetic flux in the body to be heated. When the mechanical means move the field magnet, the flux established in the body being heated will tend to move the body.

The forces resulting from the movement of the flux in the body and which tend to move the body may, to a great extent, be eliminated insofar as they follow the direction of movement of the magnet by providing laminated conducting pieces of ferro-magnetic material between the magnets moved by the mechanical means and the stationary body to be heated. When the laminated conducting pieces are to be used, the magnets create magnetic fields of alternate polarities next adjacent the body to be heated which have no, or practically no, motion components directed in the line of movement of the magnetic field. In such an instance, the magnetic field will be directed transversely to the direction of movement of the field magnet; thus, there will remain only the moving forces emanating from the opposing field of the eddy currents.

The laminated conducting pieces for conducting the magnetic flux may be embedded in the plate or top which supports the pan or body to be heated and which is of electrically non-conducting and heat-resisting material. In this way, the formation of eddy currents in the plate or top is avoided. If a heat resistant insulating material is used for this plate, such as, for example, asbestos, silicon or similar materials, the plate or top will not draw heat from the body or pan being heated by the eddy currents.

In a further development of the invention, the drive motor or mechanical means for moving the movable field magnet is protected from overloading by making the field magnet adjustably movable in a direction perpendicular to its normal direction of movement. The field magnet may be held at a minimum distance from the body to be warmed, or from the intervening conducting pieces or laminations, by means of a spring, counter-weight, or the like, so that the magnetic pole pieces will not frictionally engage the pan, the top, or the laminated conductors.

In operation, the magnetic opposing field generated by the eddy currents repels against the moving field magnet and the spring. If the opposing field generated by the eddy currents begins to exert a braking force which overloads the drive motor, the spring permits an increasing of the air gap, or the distance between the magnet poles and the laminated conductors, the top, or the body to be heated. By this pressing back of the moving magnet, the air gap between its poles and the eddy current generated field is increased until a condition of balance between the force of the opposing field of the eddy currents and the force of the spring occurs. In this way, the size of the eddy currents is reduced to such a value that the drive motor is not overloaded.

It has also been found that the radially arranged magnet poles in the field magnet and on a rotatable disc and the laminated conducting members, or the body of material, may be separated by an air gap of varying dimensions. For example, when a rotatable field magnet is used, the distance across the air gap nearest the center of rotation may be less than the distance across the air gap on the edge of the magnet poles furthest from the center of rotation. This makes it possible to so reduce the flux density from the smaller to the larger diameters of the gap that the heating by the eddy currents, which depends on both the flux density and the speed of movement, is kept equal for the whole path stressed by the lines of force.

In view of the foregoing, it is apparent that one of the objects of the present invention is to provide a simple inexpensive method and device for heating bodies of material by subjecting those bodies to a moving magnetic field.

A further object of the invention is to provide a pan or container for material to be heated which may be subjected to a moving magnetic field and which will become heated by eddy currents and/or hysteresis effects resulting from that magnetic field.

A further object of the invention is to provide mechanical means for moving the magnetic field relative to the pan and means to control that mechanical means and/or the distance between the field pole moved by the mechanical means and the pan in such manner that the intensity of heating is controlled.

Figure 2:
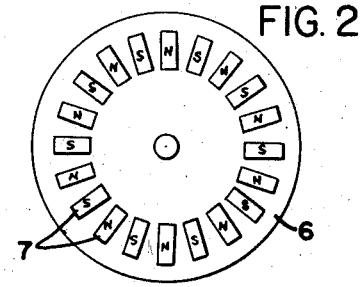
Figure 3:
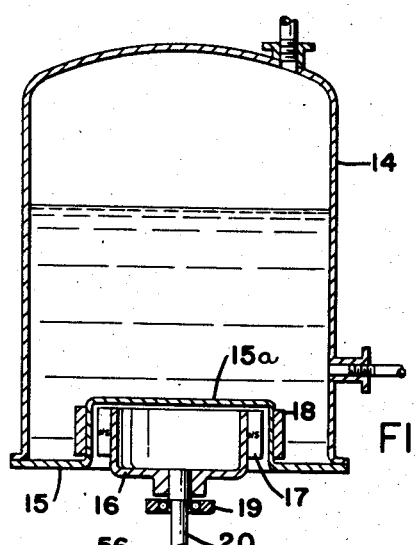
Figure 4:
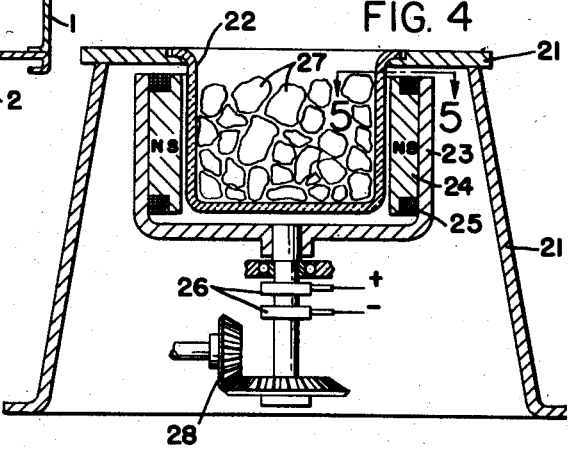
Figure 5:
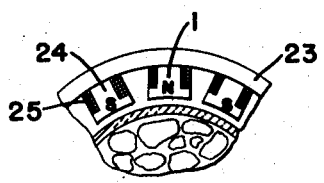
Figure 6:
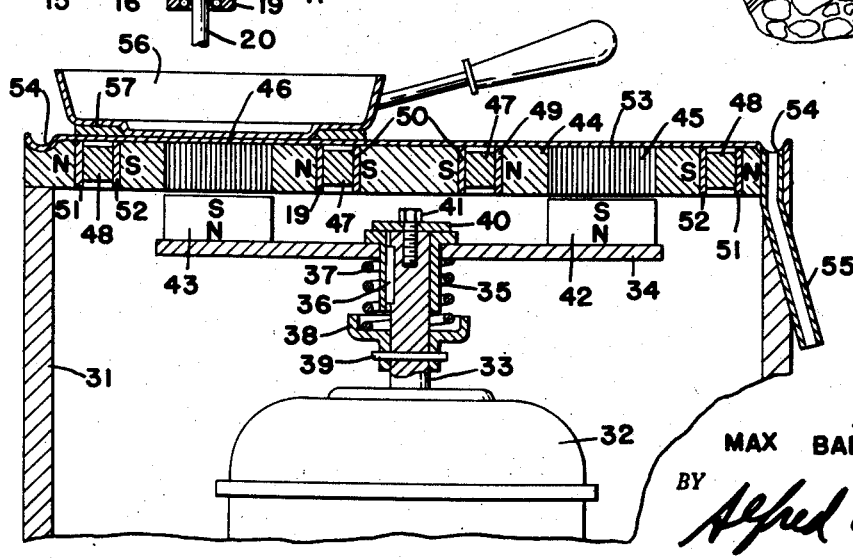
Figure 7:
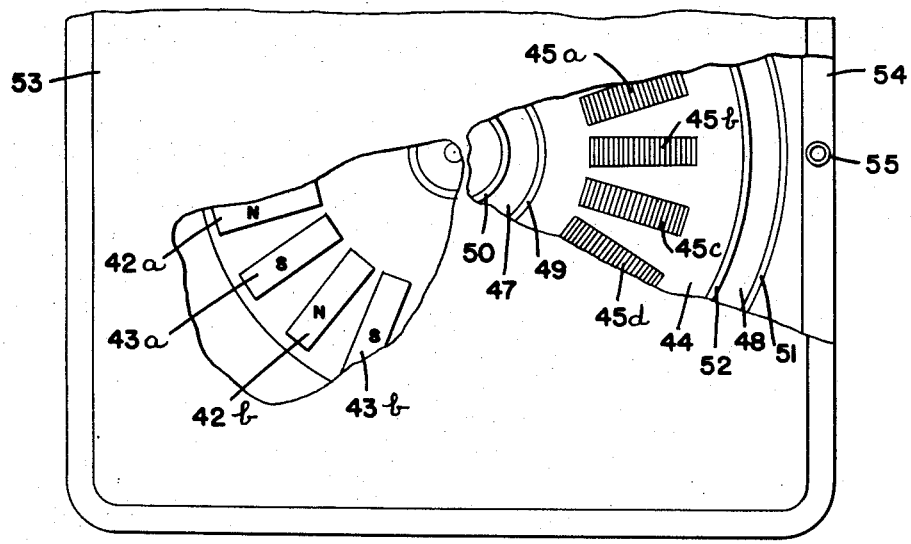
Figure 8:
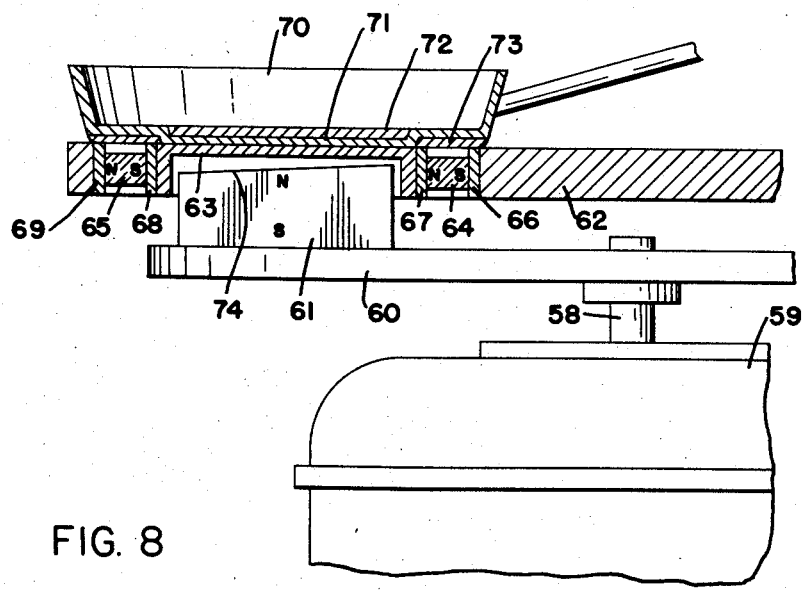

The invention may take physical form in the embodiments as described and as illustrated in the drawings in which:

Figure 1 is a sectional view incorporating the preferred embodiment of the invention, Figure 2 is a sectional view taken approximately along the line 2—2 of Figure 1, Figure 3 is a sectional view illustrating a modification of the invention for use in creating steam, Figure 4 is a sectional view illustrating a modification of the invention for use in heating metallic bodies, Figure 5 is a view approximately along the line 5—5 of Figure 4, Figure 6 is a sectional view illustrating a modification of the invention, Figure 7 is a fragmentary plan view of the structure of Figure 6 with parts broken away, and Figure 8 is a sectional view illustrating another modification of the invention.

Referring now to the drawings wherein the invention is illustrated for use in cooking foods, or the like, or heating material in pans, the device consists of a housing 1 having a base 2 provided with a socket 3 which carries an electric motor 4. The socket 3 may be provided with threads into which the electric motor 4 is screwed. The motor 4 has a shaft 5 carrying a disc 6 of a ferro-magnetic material and on which an annular ring of permanent magnets 7 is fastened perpendicular to the disc surface. In this instance, the permanent magnets have a prismatic cross section in which the longer side surfaces lie in a radial direction. They are magnetized perpendicular to the disc plane in such a way that alternate north and south poles lie side by side in a circular path around the disc. Covering the housing 1 is a plate, or top 8 of non-magnetic material such as plastic, asbestos, or other insulating materials, which extends and is positioned above the magnetic disc. The plate or top 8 has a circular groove 9 on the side thereof next to the pole wheel or disc 6 and into which the permanent magnets 7 extend.

The plate 8 is also provided at suitable locations with permanent magnets 11 with respective pole shoes 10. These permanent magnets and pole shoes 11 and 10 are positioned on the inside and on the outside of the circular groove 9 and may be imbedded in the plate 8 if desired. The permanent magnets 11 magnetically hold a pan, such as the pan 12, on the top 8. The pan 12 is preferably made of an electrically conductive material, such as copper, and has a plate 13 of corresponding size and ferro-magnetic material soldered or otherwise secured tightly on the inside of the bottom of the pan 12 so that the electrically conductive material, such as copper, is between the ferro-magnetic material 13 and the field magnet, or permanent magnets 7. The permanent magnets 11, which are in the top 8, cooperate with the ferro-magnetic material 13 to stationarily hold the pan 12 in desired position on the top 8. It is understood that other suitable holding devices may be used if desired.

Energization of the motor 4 causes it to rotate through shaft 5, the disc 6 thereby revolving the permanent magnets 7 in the groove 9 and opposite the pan on the plate 8. Magnetic flux from the permanent magnets 7 passes between adjoining magnets and through the bottom of the pan 12. Since adjacent magnets have opposite polarities, a continually changing polarity of magnetic flux, or a flux which continually changes directions, is established in quick succession through the bottom of the pan 12. This flux reacts on the electrically conductive material in the bottom of the pan 12 and establishes eddy currents therein which heat the pan and material contained in the pan. Since the bottom 13 is of ferro-magnetic material, the magnetic flux passing therethrough will heat the ferro-magnetic material 13 by means of hysteresis losses. The heat thus generated in the pan, both in the electrically conductive material in the bottom and in the ferro-magnetic material, heats the container or any food or other material contained therein.

It is well known that rapid revolution of the disc 6 would affect the bodies to be heated and the forces exerted thereon by the flux from the magnet poles 7 would tend to move the pan 12. However, the permanent magnets 11 hold the pan stationarily in place and prevent magnetomotive powers, or forces from the rapid revolution of the disc, from moving the pan 12.

The example illustrated in Figure 3 deals with the creation of steam in a water-filled boiler 14 having a bottom 15 of a somewhat hat-shape and made from electrically conductive material, such as, for example, copper. The bottom 15, since it is hat-shape, has a cylindrical part or portion 15a, in which a bell 16 of ferro-magnetic material revolves. The bell 16 has permanently magnetized magnets 17 on the surface thereof so arranged in alternating sequence that a small air gap remains between the pole surfaces and the wall of the cylindrical part 15a. The cylindrical part 15a may be encircled by a ring 18 of ferro-magnetic material which is fastened on the inside of the boiler and on the surface of the portion 15a which is farthest from the permanent magnets 17, and which is in the water space.

The bell 16 is mounted on a drive shaft 20 and supported by a bearing 19, the drive shaft being coupled to an electric motor, or other drive means, which is not shown. Energization of the electric motor rotates the drive shaft 20 and the bell 16 therewith, whereupon the magnetic flux of the magnets 17 flow rapidly and in alternating directions through both the surface of the copper or electrically conductive cylindrically shaped bottom portion 15a and the ferro-magnetic ring 18 to cause a heating of these parts by eddy currents and/or hysteresis effect. This heat is then transferred to the water in the boiler. It is apparent that the operation of this embodiment of the invention is very similar to that of Figure 1.

Another example of the invention is shown in Figures 4 and 5 wherein metallic bodies may be melted or heated by the heat generated by mechanically rotating the field magnets. In this instance, a crucible 22 of fireproof material is set into the ring shaped opening of a rack 21. The crucible is enveloped with an air gap by a revolving bell 23 of ferro-magnetic material which has inner side magnet pole pieces 24 secured thereto. In this instance, these pole pieces 24 carry wire coils 25 whose ends are connected through suitable slip rings 26 with a direct current source of energy. When the electromagnets, comprising pole pieces 24 and coils 25, are energized, they establish heat in the material 27 in much the same manner as hereinbefore described in connection with Figures 1 and 3. If the material 27 is electrically conductive, eddy currents are established which will melt the material. However, if the material 27 is ferro-magnetic, the heating thereof may be accelerated by the occurrence of hysteresis effect. In this instance, the structure illustrated in Figure 4 also includes a bevel gear 28 which is in the driving mechanical means and is positioned between the motor and the shaft which rotatably supports and rotates the bell 23 carrying the magnets.

The invention may also take form as illustrated in Figure 6, in which a motor 32 is fastened to a table-like housing 31. The motor 32 has a shaft 33 supporting a circular disc-shaped magnetic ground body 34 of ferro-magnetic material. The disc-shaped body 34 is movable axially of the shaft 33 and thus perpendicular to the top of the table-like housing 31 while it is rotated by the shaft 33 by fastening the ground body 34 to the shaft 33 by means of a bushing 35 and a dowel 36. Also mounted on the shaft 33, by means of a pin 39, is a pot-shaped disc 38. Extending between this pot-shaped disc 38 and the ground body 34 is a spring 37 which presses the disc-shaped ground body 34 against an end disc 40 tightly fastened to the end of the shaft 33 by a screw 41, or the like. Mounted on the disc-shaped body 34 and adapted to revolve with it are magnets 42 and 43 which have pole ends adapted to be maintained at the desired air gap distance from the top of the table-like housing 31. The top may be in the form of a plate 44 which is in front of the pole ends of the magnets 42 and 43 and maintained an air gap distance therefrom as required for mechanical reasons. This plate 44 has embedded therein a ring of laminated pole pieces 45 and 46 and a ring of permanent magnets 47 and 48 provided with pole shoes 49, 50, 51 and 52. The plate 44 is preferably of a temperature-resistant insulating material so that no eddy currents can form in it and also so that no damage can be produced by contact transmission of heat from a pan or body which is placed on it.

The plate 44 and all of its embedded parts may be covered with an unbroken thin protective covering 53 made of heat-resistant insulating material, such as silicon, to facilitate cleaning of the upper surface of the plate 44. If desired, moisture catching grooves, such as the groove 54 around the outer edge of the plate 44 and provided with an outlet 55 which can be closed with a stopcock, may be incorporated in the covering 53 or the plate 44.

The pan or body of material to be heated, such as, for example, the pan 56 can be placed or set on the protective cover 53 on the plate 44. The pan, or other similar utensil, can be provided with a ring 57 of ferro-magnetic material on the outer edges thereof and cooperatively alignable with the pole shoes of the magnets 47 and 48 to hold the pan 56 in position and stationary relative to the table top.

In this modification, if the movement or rotation of the disc 34 is sufficient to establish eddy currents capable of exerting a braking action on the driving motor 32 which exceeds the safe load factor of this motor 32, the repulsing force of the opposing field generated by the eddy currents on the permanent magnets 42 and 43 become sufficiently great that they press against the spring 37 in an axial direction relative to the shaft of the motor. The spring 37 is tensioned so that this displacement movement cannot begin until the maximum admissible braking is exceeded, or the load factor of the motor is exceeded. When the load factor of the motor is exceeded, the spring is compressed sufficiently to increase the air gap distance between the magnets 42 and 43 and the laminations in the plate 44 to reduce the magnetic flux in the pan 56 and thus decrease the eddy currents and relieve some of the load on the motor.

Further details of the disc 34 with the magnets thereon and the laminations in the top 44 are apparent in Figure 7. The circular disc 34 is illustrated herein with magnets 42a, 42b, and 43a and 43b, while the plate 44 is illustrated with laminated pole pieces 45a, 45b, 45c and 45d embedded in it as well as with magnets 47 and 48 and their pole shoes 49 and 50, 51 and 52.

In Figure 8, a further modification is illustrated wherein a circular disc-shaped ground body 60 is fastened to the shaft 58 of a motor 59 with the ground body 60 carrying permanent magnets 61. A non-conducting heat-resistant material plate 62 extends over the ground body 60 and is provided on its underside with an annular groove 63 into which the magnet 61 fits, and in which the magnet is revolved about the axis of the motor. Suitable radially magnetized permanent magnets 64 and 65 with respective pole shoes 66, 67, 68, and 69 are embedded in rings in the plate 62 and around the annular groove 63 and are cut off flush with the upper surface of the plate 62. As in the other modifications, a kitchen pan, container, or other material to be heated, is placed above the groove 63 and on the plate 62, such as, for example, the pan 70 illustrated in the drawing.

This pan 70 has a bottom 71 pressed through and covered on the inner hollow side thereof with a plate 72 and on the outer edge side thereof with a ring 73. The plate 72 cuts off eddy current-creating magnetic flux permeating the bottom 71 from the magnet 61 while the ring 73 connects the pan 70 detachably with the plate 62 by means of magnets 64 and 65. In this illustration, the magnets 61 are each provided with a bevel pole surface 74 in such manner that the air gap between the edge of the magnet 61 closest to the axis of its revolution is less than the air gap on the outer edge which is furthest from its axis of revolution so that the bottom 61 of the pan 70, which is made of good electrically conductive material, is evenly heated throughout the whole area permeated by the lines of magnetic flux.

It will be appreciated that preferred forms only which the invention may take have been illustrated and described in this specification. Obviously, modifications and alterations differing radically in appearance from those herein described will occur to others on a reading and understanding of this specification. It is my intention to include all such modifications and alterations insofar as they come within the scope of the appended claims.

Having thus described my invention, I claim:

1. A heating appliance comprising in combination: a cooking top in the form of a support of electrically non-conductive, low magnetically permeable material for supporting electrically conductive articles, a plurality of spaced permanent magnets below and in closely spaced relationship to said support, said magnets being magnetized on an axis through said support and with adjacent magnets having an alternating magnetic polarity and means for moving said magnets below to said support in closely spaced relationship thereto.

2. A heating appliance comprising in combination: a horizontally extending support of electrically non-conductive low magnetically permeable material adapted to have electrically conductive articles to be heated placed on the upper surface thereof, an annulus of spaced permanent magnets arranged in close spaced relationship under said support and having a substantially vertical axis of rotation, said magnets each having an axis of magnetization through said support and adjacent magnets having opposite magnetic polarity, and means for rotating said magnets about said axis of rotation.

3. A heating appliance comprising in combination: a cooking top in the form of a support of electrically non-conductive magnetically low permeability material adapted to have electrically conductive articles placed on the upper surface thereof, a movable member positioned below and in generally spaced parallel relationship to said support, a plurality of spaced permanent magnets carried by said member, said magnets having an axis of magnetization perpendicular to said member and adjacent magnets having opposite magnetic polarization, and means for moving said member and said magnets below said support parallel thereto.

4. A heating appliance comprising in combination a horizontal support of electrically non-conductive magnetically low permeability material adapted to have an electrically conductive article to be heated positioned on the upper surface thereof, a movable member in spaced parallel relationship below said support, an annulus of circumferentially spaced permanent magnets on said member below said support and closely spaced therefrom, said magnets having an axis of magnetization perpendicular to said member and adjacent magnets having opposite magnetic polarization, and means for rotating said member about an axis perpendicular to said support.

5. The combination of claim 4 wherein said permanent magnets have a privileged magnetic direction parallel to the axis of polarization.

6. The combination of claim 4 wherein said permanent magnets have a greater magnetic permeability in the direction of the axis of magnetic polarization than in other directions.

7. The combination of claim 4 wherein the upper surfaces of said magnets have an outward and downward taper.

8. In a heating appliance having a horizontal support of electrically non-conductive and magnetically low permeability material adapted to have electrically conductive articles to be heated positioned on the upper surface thereof, the improvement which comprises a member of ferro-magnetic material mounted below said support for rotation about a vertical axis, an annulus of circumferentially spaced permanent magnets carried by said member and positioned in closely spaced relationship below said support, said magnets having an axis of magnetization perpendicular to said support and having alternating magnetic polarity, and means for rotating said member about said vertical axis.

9. A heating appliance comprising in combination a horizontal support of electrically non-conductive magnetically low permeability material adapted to have electrically conductive articles to be heated positioned on the upper surface thereof, an annulus of circumferentially spaced magnet members in closely spaced relationship below said support, means supporting said annulus for rotation about an axis perpendicular to said support, said magnets having an axis of magnetic polarization perpendicular to said support and adjacent magnets having opposite magnetic polarity yieldable means biasing said magnets upward into closely spaced relationship to said support, and power means for rotating supporting means and said annulus.

10. The combination of claim 9 wherein said power means has a predetermined full load rating, and said yieldable means is yieldable to increase the spacing between the said magnets and the horizontal support as the power required to rotate said magnets approaches or equals said full load rating of said power means.

11. A heating appliance comprising in combination a horizontal support of electrically non-conductive and magnetically low permeability material adapted to have positioned thereon electrically conductive articles to be heated, means for heating said electrically conductive articles comprising a member of magnetically permeable material mounted below said support, an annulus of circumferentially spaced permanent magnets fixedly mounted on said member in closely spaced relationship below said support, said magnets having a substantially vertical axis of magnetization and adjacent magnets having opposite magnetic polarity, power means for rotating said member and said magnets about an axis perpendicular to said support whereby to induce eddy currents to flow in said electrically conductive articles, said member being mounted for movement towards and away from said support, yieldable means biasing said member towards said support, and stop means limiting the movement of said member toward said support.

12. The combination of claim 11 wherein said power means has a predetermined maximum power rating, and said yieldable means yields to permit said member and said magnets to move down away from said support as the force required to rotate said member approaches or equals said maximum power rating.

13. A heating appliance comprising in combination: a horizontally extending workpiece support of electrically nonconducting and magnetically low permeability material adapted to have positioned thereon magnetically permeable electrically conductive articles to be heated, a plurality of magnets mounted for movement in closely spaced relationship under said support and adapted to project a magnetic flux field therethrough to heat said articles, and holding means preventing horizontal movement of the article under the influence of the moving magnetic flux field.

14. The combination of claim 13 wherein said holding means comprise magnet members mounted in said support in laterally spaced relation to the path of movement of said plurality of magnets.

15. The combination of claim 13 wherein said magnets are electro magnets.

16. The combination of claim 13 wherein said magnets are permanent magnets.

17. A heating appliance comprised of a horizontal support of electrically low conductive and magnetically low permeability material adapted to support electrically conductive articles to be heated, a plurality of magnet members mounted for movement under said support and adapted to project a magnetic flux upwardly through said support into said article and induce heating currents therein, and means for regulating the temperature of the article comprising temperature responsive means for automatically varying the distance between the magnet members and said article as said article heats.

18. Heating apparatus comprising in combination a horizontally extending workpiece support of electrically low conductivity and magnetically low permeability adapted to have electrically conductive articles to be heated positioned on the upper surface thereof, a plurality of movable magnets positioned below said support and having a predetermined line of movement, and means for conducting flux of said magnets upwardly through said support comprising a plurality of members mounted in said support in spaced relationship parallel to said line of movement, each of said members being comprised of a stack of thin laminations of magnetically permeable material with the plane of said laminations being perpendicular to the plane of said support and parallel to the line of movement of said magnets.

19. A heating appliance comprising in combination: a horizontal support of electrically non-conductive and low magnetically permeable material adapted to have electrically conductive members to be heated placed on the upper surface thereof, a pair of concentric annuli of spaced permanent magnets each arranged in close spaced relationship to the under surface of said support, said magnets having a vertical axis of magnetization and adjacent magnets having opposite magnetic polarity, and means for rotating said annuli in opposite direction about the axis of said annuli.

20. A heating appliance comprising in combination: a support of electrically non-conductive, low permeability material, means carried by said support for positively holding in place at one side of said support an article to be heated, a plurality of spaced permanent magnets at the opposite side of said support in closely spaced relationship thereto, said magnets being magnetized on an axis through said support and adjacent pairs of said magnets having alternating magnetic polarity, and means for moving said magnets relative to said support through a closed path close to the support.

21. A heating appliance comprising in combination: a support of electrically non-conductive, low permeability material, an electrically conductive member supported by said support, a plurality of spaced permanent magnets below and in closely spaced relationship to said support, said magnets being magnetized on an axis through said support and adjacent pairs of said magnets having alternating magnetic polarity, and means for moving said magnets below said support in closely spaced relationship thereto to induce eddy currents in said electrically conductive member.

22. A heating appliance comprising in combination: a support for supporting an electrically conductive article, a plurality of magnets below said support, said magnets presenting upwardly facing pole tips of permanent magnet material which are positioned closely below said support, and each of which is magnetically privileged in a direction upwardly toward said support, with adjacent magnets having alternating polarity so as to produce magnet fields which extend up through said support, and means for rotating said magnets below said support.

23. The heating appliance of claim 22 wherein said magnets are electro magnets.

References Cited in the file of this patent

UNITED STATES PATENTS

| 2,481,172 | Staggs | Sept. 6, 1949 |
| 2,527,237 | Wilcox | Oct. 24, 1950 |
| 2,566,274 | White et al. | Aug. 28, 1951 |
| 2,753,474 | Walworth et al. | July 3, 1956 |
| 2,769,932 | Zozulin et al. | Nov. 6, 1956 |

FOREIGN PATENTS

| 167,545 | Great Britain | Aug. 5, 1921 |
| 609,718 | Great Britain | Oct. 6, 1948 |